United States Patent
Itaya et al.

(10) Patent No.: US 9,117,562 B2
(45) Date of Patent: Aug. 25, 2015

(54) METHOD FOR PRODUCING SCINTILLATOR PANEL, SCINTILLATOR PANEL AND FLAT PANEL DETECTOR

(75) Inventors: Keiko Itaya, Tokyo (JP); Tadashi Arimoto, Tokyo (JP)

(73) Assignee: KONICA MINOLTA MEDICAL & GRAPHIC, INC., Tokyo (JP)

( * ) Notice: Subject to any disclaimer, the term of this patent is extended or adjusted under 35 U.S.C. 154(b) by 725 days.

(21) Appl. No.: 13/365,019

(22) Filed: Feb. 2, 2012

(65) Prior Publication Data
US 2012/0211661 A1 Aug. 23, 2012

(30) Foreign Application Priority Data
Feb. 17, 2011 (JP) ................... 2011-031729

(51) Int. Cl.
G21K 4/00 (2006.01)
G01T 1/20 (2006.01)
G01V 5/00 (2006.01)
G01T 1/202 (2006.01)

(52) U.S. Cl.
CPC ... *G21K 4/00* (2013.01); *G01T 1/20* (2013.01); *G01T 1/202* (2013.01); *G01V 5/0025* (2013.01); *G01V 5/0066* (2013.01); *G21K 2004/06* (2013.01); *G21K 2004/10* (2013.01); *G21K 2004/12* (2013.01)

(58) Field of Classification Search
CPC . G21K 4/00; G21K 2004/00; G21K 2004/06; G21K 2004/10; G21K 2004/12; G01T 1/202; G01T 1/20
USPC ............... 250/361 R, 362, 367, 472.1, 473.1
See application file for complete search history.

(56) References Cited

U.S. PATENT DOCUMENTS

| 7,375,341 | B1* | 5/2008 | Nagarkar et al. | 250/370.11 |
| 8,106,363 | B2* | 1/2012 | Yip | 250/370.09 |
| 2004/0200973 | A1* | 10/2004 | Ogawa | 250/370.11 |
| 2007/0054041 | A1* | 3/2007 | South | 427/208.2 |
| 2010/0127180 | A1* | 5/2010 | Lifshitz et al. | 250/367 |

FOREIGN PATENT DOCUMENTS

| JP | 2004-105518 | 4/2004 |
| JP | 2005-114456 | 4/2005 |
| JP | 2005-338067 | 8/2005 |
| JP | 2006-038870 | 2/2006 |
| JP | 2008-139291 | 6/2008 |

* cited by examiner

*Primary Examiner* — David Porta
*Assistant Examiner* — Carolyn Igyarto
(74) *Attorney, Agent, or Firm* — Lucas & Mercanti, LLP

(57) ABSTRACT

The steps of the method to make the scintillator panel are providing a first support having thereon a phosphor layer; dividing the first support the phosphor layer into a plurality of scintillator panel sections each having a first support section and a phosphor layer section thereon; providing an adhesive member between a side of the first support section of each of the plurality of the scintillator panel sections and a side of a second support; adhering the plurality of the scintillator panel sections onto the second support; forming a protective layer on a whole surface of the plurality of the scintillator panel sections except a portion of the scintillator panel sections which is contacted with the adhesive member; and separating the scintillator panel sections with their protective layer thereon from the second support. The separated scintillator panel sections with their protective layer are then adhered to light receiving element to form the flat panel detector.

6 Claims, 5 Drawing Sheets

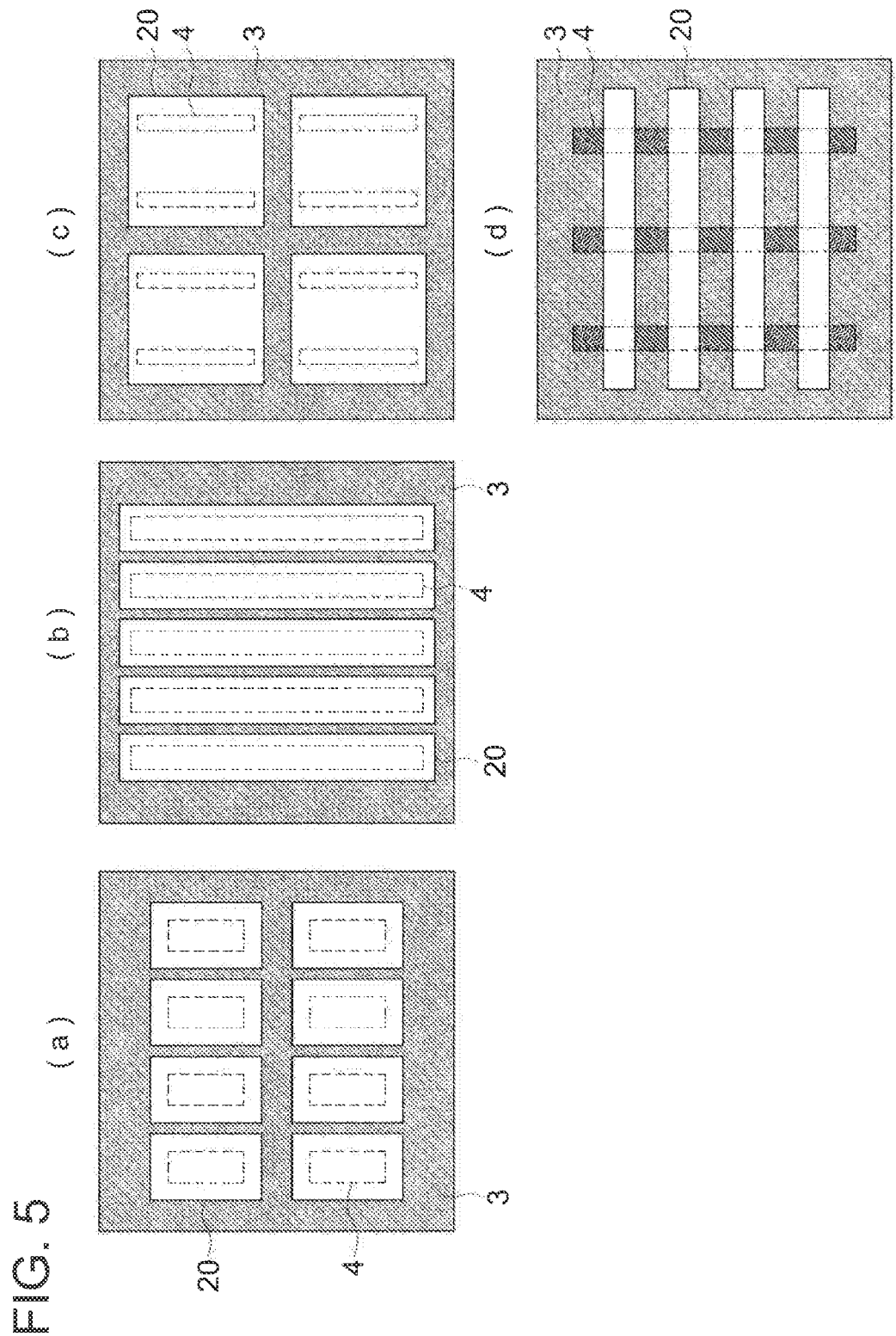

METHOD FOR PRODUCING SCINTILLATOR PANEL, SCINTILLATOR PANEL AND FLAT PANEL DETECTOR

This application is based on Japanese Patent Application No. 2011-031729 filed on Feb. 17, 2011, in Japanese Patent Office, the entire content of which is hereby incorporated by reference.

TECHNICAL FIELD

The preset invention relates to a method for producing a scintillator panel used for a radiographic image detector.

BACKGROUND

As a flat panel type radiation detector (FPD) developed for a digital radiographic image technique which can acquire directly a digital radiographic image, there are two types of methods. One of them is a scintillator method in which a radiation is converted to a visible light with a phosphor such as $Gd_2O_2S$ or CsI, then the visible light is converted into an electric charge with a photodiode. Another is a method in which X-rays are directly converted into an electric charge with an X-ray detection element represented by a Se detector.

As a flat panel detector of a scintillator method, it is known, for example, a flat panel type radiation detector (FPD) which is made of a scintillator panel having a phosphor layer; and a photoelectric conversion element containing a thin film transistor (TFT) combined with a charge coupled device (CCD), as described in Japanese Patent Application Publication (JP-A) No. 2005-114456.

The above-described FPD using a scintillator panel having a phosphor layer has been widely used in recent years for a nondestructive examination in the industrial filed or for an application to a dental use which collects still images by introducing in an oral cavity.

In these applications, it is required diversification of magnitude and forms of device. For example, in the application for a dental diagnosis filed, it is required a small device used for an oral cavity, and a variety of forms used for panoramic radiography or cephalic radiography.

And for a small device, it is required to a detector having a large effective image taking region. Moreover, for diversification of form, it is required to efficiently produce scintillator panels of various sizes with relatively small size in the production step.

As a phosphor used for a phosphor layer of a scintillator provided with a phosphor layer, it is advantageously used a phosphor composed of cesium iodide (CsI) as a mother body and an activator contained therein from the viewpoint of conversion efficiency from X-rays to a visible light.

Since a phosphor layer used with a phosphor composed of cesium iodide (CsI) as a mother body and an activator contained therein has a deliquescent property and easily damaged, it will be relatively easily deteriorated with age. Therefore, usually, a protective layer is provided on the phosphor layer for use.

As a method far preparing a protective layer for use, there is disclosed a method in which an upper portion and a lateral face portion of a phosphor layer and an outer peripheral portion of the support are covered with a polyparaxylylene resin (for example, refer to JP-A No. 2004-105518). Another known method is a method in which at least the opposite side of the scintillator panel facing the support and the lateral shoe of the scintillator panel are covered with a transparent resin film having a water transmissivity of less than 1.2 $g/m^2$ per a day.

Moreover, the following method are known; a technology of covering the whole surface of the support including the scintillator portion with polyparaxylylene as disclosed in JP-A No. 2002-116258; a technology of providing unevenness to the support so as to prevent polyparaxylylene floor peeling of as disclosed in JP-A No. 2005-338067; and a technology of fusing the edge portion of the phosphor so that the edge portion of the phosphor may not damage the inner portion of the film when the substrate is a transparent resin film as described in JP-A No. 2008-139291.

Moreover, in order to improve protection ability, therein known a method of vapor-depositing the material of a phosphor layer under the condition of supporting the substrate to be formed with a scintillator layer thereon at three or more very small points (refer to Patent document 1).

However, by using the above-described conventionally known methods, there are problems of insufficient optically effective area or low production efficiency when it is intended to produce a small-sized device, and a relatively small-sized device of various sizes.

Patent document 1: JP-A No. 2006-38870

SUMMARY

An object of the present invention is to provide a production method for a scintillator panel which can produce a scintillator panel having a variety of sizes with high production efficiency and low cost, and further, to provide a production method for a scintillator panel which can produce a scintillator panel having a large effective image area with high production efficiency and low cost.

The above-described problems relating to the present invention can be resolved by the following embodiments.

1. A method for producing a scintillator panel comprising a first support having thereon a phosphor layer, and a protective layer on the phosphor layer, the method comprising the steps of:
    (1) dividing a first scintillator panel comprising the first support having thereon the phosphor layer into a plurality of second scintillator panels;
    (2) providing an adsorbing member between a side of the first support of each of the plurality of the second scintillator panels and a side of a second support; and allowing to adsorb the plurality of the second scintillator panels onto the second support;
    (3) forming a protective layer on a whole surface of the plurality of the second scintillator panels except a portion of the second scintillator panels which is contacted with the adsorbing member.

2. The method for producing a scintillator panel of the aforesaid item 1, after the protective layer forming step, further comprising the step of
    peeling off the adsorbing member from the first support.

3. The method for producing a scintillator panel of the aforesaid item 2, wherein the peeling off step is a heat-peeling off step which applies heat to the adsorbing member.

4. The method for producing a scintillator panel of any one of the aforesaid items 1 to 3, wherein the protective layer contains at least polyaraxylylene.

5. A scintillator panel produced by any one of the methods of the aforesaid items 1 to 4.

6. A flat panel detector provided with the scintillator panel of the aforesaid item 5.

By the above-described embodiments of the present invention, it is possible to provide a production method for a scintillator panel which can produce a scintillator panel having a variety of sizes with high production efficiency and low cost, and further, it is possible to provide a production method for a scintillator panel which can produce a scintillator panel having a large effective image area with high production efficiency and low cost.

BRIEF DESCRIPTION OF THE DRAWINGS

FIG. 5 shows a schematic plain figure which shows examples of an arrangement of an adsorbing member.

DESCRIPTION OF NUMERIC DESIGNATIONS

Figure 1:
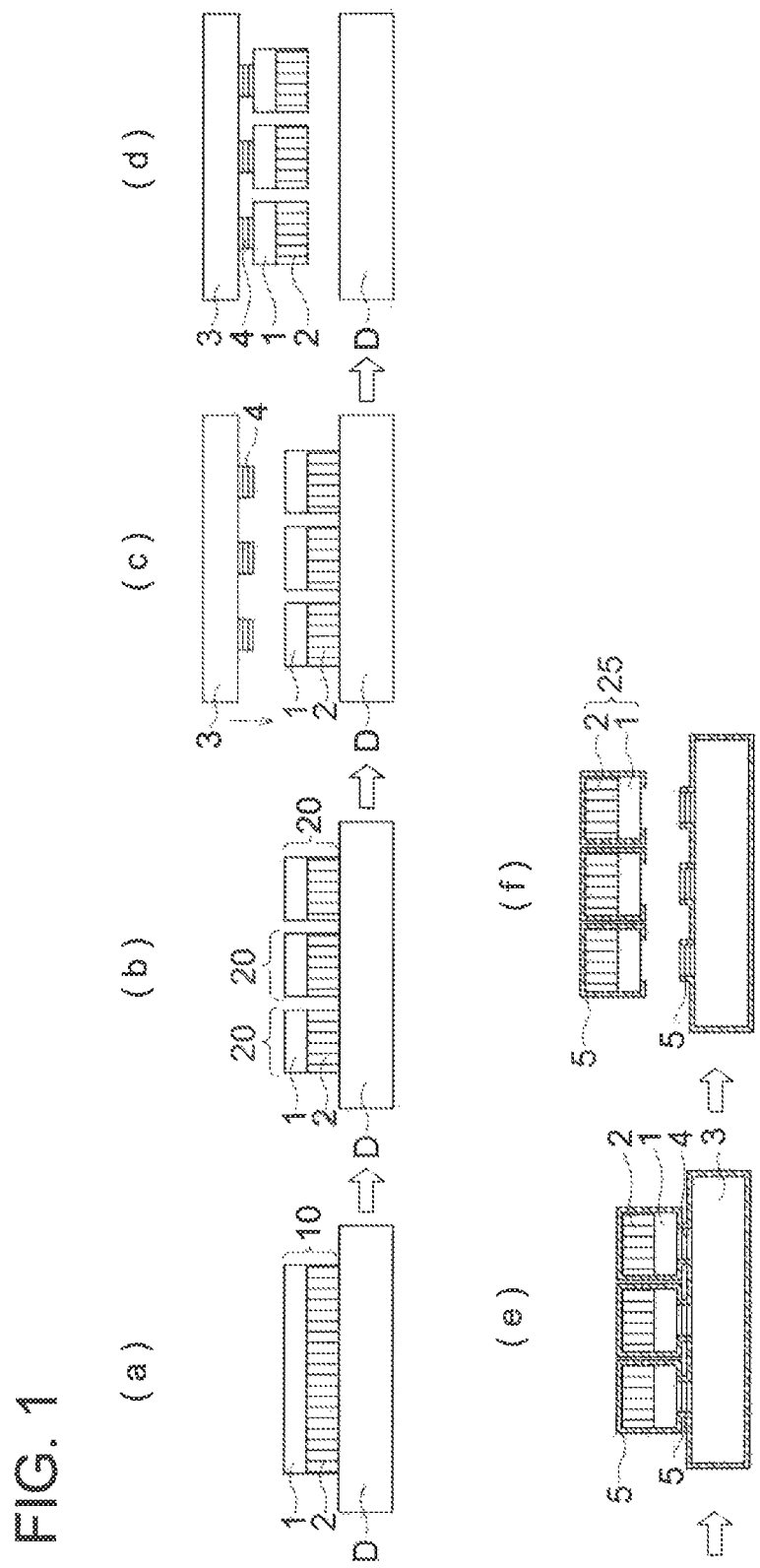
FIG. 1 shows a schematic sectional view of a production method of a scintillator panel.

1: First support
2: Phosphor layer
3: Second support
4: Adsorbing member
5: Protective layer
10: First scintillator panel
20: Second scintillator panel
25: Scintillator panel provided with a protective layer
30: Laser cutting device
31: Laser generator
33: Purge chamber
34: Exhaust pipe
35: Light transmissive window
100: Flat panel detector
111: Signal take-out section
130: Adhesive layer
140: Housing
961: Vapor deposition device
962: Vacuum vessel
963: Boat
964: Holder
965: Rotation mechanism
966: Base board
D: Base board

PREFERRED EMBODIMENTS OF THE INVENTION

The present invention is a method for producing a scintillator panel comprising a first support having thereon a phosphor layer, and a protective layer on the phosphor layer, and the method is characterized by having the following steps of:
(1) dividing a first scintillator panel comprising the first support having thereon the phosphor layer into a plurality of second scintillator panels;
(2) providing an adsorbing member between a side of the first support of each of the plurality of the second scintillator panels, being located at opposite the phosphor layer, and a side of a second support; and allowing to adsorb the plurality of the second scintillator panels onto the second support;
(3) forming a protective layer on a whole surface of the plurality of the second scintillator panels except a portion of the second scintillator panels which is contacted with the adsorbing member.

In the present invention, in particular, the divided plurality of scintillator panels are adsorbed on a second support, and the scintillator panels are provided with a protective layer in the state of adsorbed on the second support. Subsequently, the second support is peeled off to produce a scintillator panel having an intended size. Thus, a scintillator panel having a variety of sizes can be produced with high production efficiency and low cost.

Further, by using a material which peels off with applying heat as a adsorbing member, it can product a scintillator panel having a variety of sizes with higher production efficiency and lower cost.

(1) Dividing Step:

In the dividing step, a first scintillator panel comprising a first support having thereon a phosphor layer is divided into a plurality of second scintillator panels.

(First Scintillator Panel)

Although a first scintillator panel has a composition of having a phosphor layer on a first support, it is more preferable, an embodiment which has a sublayer between the first support and the phosphor layer.

FIG. 1 shows a schematic sectional view of a production method of a scintillator panel. In FIG. 1, (a) indicates a state in which a first scintillator panel having a phosphor layer on a first support is set on a base board D with placing the phosphor layer 2 contacting with the baseboard D.

A first scintillator panel may be provided with a reflective layer on a first support, and it may have a composition of a reflective layer, a sublayer and a phosphor layer located in this order on the first support. Hereafter, each composing layer and composing elements will be described.

(First Support)

A first support relating to the present invention is a tabular object which can support a phosphor layer, and it is preferable to use a material which can transmit an incident dose of radiation such as X-rays in an amount of 10% or more.

As a first support, it can be used the following various materials: (1) carbon fiber reinforced plastics (CFRP); (2) carbon board (material prepared by carbonizing charcoal and paper); (3) carbon support (graphite support); (4) plastic support; (5) glass support; (6) various kinds of metal support; (7) composite material made of the thin-layer of the above-described (1) to (6) sandwiched with a foamed resin.

The above-described various materials can be used for the fast support of the present invention. Among them, it can be used a Si substrate on which a light receiving region (a light sensitive portion) is formed by arranging photodiodes which performs photoelectric conversion in a two dimensional state; or a glass substrate on which a photodiodes or thin film transistors (TFT) which perform photoelectric conversion are arranged in divided regions made of a plurality of scanning lines and a plurality of signal lines so that a TFT source electrode, a gate electrode and a drain electrode are each respectively connected to a photodiode, a scanning line and a signal line.

In the present invention, it is preferable to use a plastic support.

As a support which can be used in the present invention include resin films such as: cellulose acetate film, polyester film, polyethylene terephthalate (PET) film, polyethylene naphthalate (PEN) film, polyamide film, polyimide (PI) film, triacetate film, polycarbonate film and carbon fiber reinforced resin.

Among them, a resin film containing polyimide or polyethylene naphthalate is particularly suitable when a phosphor layer is formed using cesium iodide as a raw material.

The first support of the present invention has preferably a thickness of 50 to 250 μm, and it is preferable to be a support provided with flexibility.

Herein, "a support provided with flexibility" refers to a support exhibiting an elastic modulus at 120° C. (also denoted as E120) of 1,000 to 6,000 N/mm$^2$. A preferable support having such properties is a resin film containing polyimide or polyethylene naphthalate.

The first support used in the invention preferably exhibits an elastic modulus at 120° C. (E120) of 1,000 to 6,000 N/mm$^2$, and more preferably 1,200 to 5,000 N/mm$^2$.

Specific examples include polymer film comprised of polyethylene naphthalate (E120=4,100 N/mm$^2$), polyethylene terephthalate (E120=1,500 N/mm$^2$), polybutylene naphthalate (E120=1,600 N/mm$^2$), polycarbonate (E120=1,700 N/mm$^2$), syndiotactic polystyrene (E120=2,200 N/mm$^2$), polyether imide (E120=1,900 N/mm$^2$), polyacrylate (E120=1,700 N/mm$^2$), polysulfone (E120=1,800 N/mm$^2$) or polyether sulfone (E120=1,700 N/mm$^2$).

The above-described "elastic modulus" is obtained by the following method. In the region showing a linear relationship between strain and =responding stress which is measured by using a tensile strength tester based on JIS C 2318, the elastic, modulus is calculated as the slope of the straight portion of the stress-strain curve, that is, a strain divided by a stress. It is also referred to as a Young's modulus. In the invention, such a Young's modulus is also defined as an elastic modulus.

The first support may be used singly or by mixing two or more of the above-described materials, or laminated with two or more of the above-described materials.

(Phosphor Layer)

A phosphor compound used in a phosphor layer of the present invention is a compound which absorbs incident radiation mew such as X rays and emits an electromagnetic wave having a wavelength of 300 nm to 800 nm, which is an electromagnetic wave (light) from a ultra violet wave to an infrared wave centering a visible light.

A material to form a scintillator layer of the present invention may employ a variety of commonly known phosphor materials. It is possible to use a particle type phosphor layer composed of a phosphor material and a binder resin, and as a phosphor material, it may be used particles made of $Gd_2O_2S$:Tb or $Gd_2O_2S$:Eu. Among commonly known phosphor materials, cesium iodide (CsI) is preferably employed in the invention, since it exhibits an enhanced conversion rate of X-rays to visible light and readily forms a columnar crystal structure of a phosphor with vapor deposition method, whereby scattering of emitted light within the crystal is inhibited through the light guiding effect, rendering it feasible to increase the scintillator layer thickness.

Since CsI exhibits by itself a relatively low emission efficiency, so that various activators are incorporated. For example, JP-B No. 54-35060 disclosed a mixture of CsI and sodium iodide (NaI) at any mixing ratio. Further, JP-A No. 2001-59899 disclosed vapor deposition of CSI containing an activator, such as thallium (Tl), europium (Eu), indium (In), lithium (Li), potassium (K), rubidium (Ru) or sodium (Na). In the present invention, sodium (Na), thallium (Tl) or europium (Eu) is preferred, of which thallium (Tl) is most preferred.

In particular, it is preferable to employ, as raw materials, cesium iodide and an additive containing at least one thallium compound in the present invention. Namely, it is preferable to use thallium-activated cesium iodide (denoted as CsI:Tl), which exhibits a broad emission within the wavelength region of from 400 nm to 750 nm.

Preferred examples of thallium compounds include thallium iodide (TlI), thallium bromide (TlBr), thallium chloride (TlCl), and thallium fluoride (TlF$_3$).

The melting point of a thallium compound relating to the present invention is preferably in the range of 400 to 700° C.

The thickness of the phosphor layer (or scintillator layer) is preferably 50 to 600 μm, and more preferably 50 to 500 μm when a resin film is used as a support to avoid damage of cutting during the dividing process. For application to medical use, it is preferable to be 120 to 400 μm to achieve balanced characteristics of luminance and sharpness.

(Reflective Layer)

A reflective layer reflects a light emitted from a phosphor layer, resulting in enhanced light-extraction efficiency. A reflective layer is preferably located in a position where it can reflect the light not entering into a photoelectric conversion element among all of the light emitted from the phosphor layer and can direct this reflected light to a photoelectric convulsion element. A reflective layer is commonly located at the radiation incidence side of a phosphor layer. It may be prepared at the radiation incidence side of a phosphor layer by adhering a member provided with a reflective layer or may be prepared by directly coating, sputtering or loading a reflective layer. A reflective layer may be provided on a support on which a phosphor layer is formed. In the present invention, it is preferable to prepare a reflective layer between the phosphor layer and the first support, or between the sublayer which is described later and the first support.

The reflective layer is preferably formed of a material containing an element selected from the group consisting of Al, Ag, Cr, Cu, Ni, Ti, Mg, Rh, Pt and Au. It is specifically preferable to employ a metal thin-film composed of the foregoing elements, for example, Ag film or Al film. The thickness of a reflective layer is preferably 0.005 to 0.3 μm in terms of emission-extraction efficiency, and more preferably 0.01 to 0.2 μm.

In the reflective layer, it is possible to use white pigment composed mainly of: $TiO_2$ (anatase-type and rutile-type), MgO, $PbCO_3 \cdot Pb(OH)_2$, $BaSO_4$, $Al_2O_3$, M(II)FX (provided that M(II) indicates on atom selected from Ba, Sr and Ca atom; and X indicates Cl or Br atom), $CaCO_3$, ZnO, $Sb_2O_3$, $SiO_2$, $ZrO_2$, lithopone ($BbSO_4$—ZnS), magnesium silicate, basic silica sulfuric acid salt, basic lead phosphate and aluminum silicate.

(Sublayer)

In the present invention, it is preferable to provide a sublayer between the Rust support and the phosphor layer, or between a reflective layer and a phosphor layer. The aforesaid sublayer may be prepared with a method of forming a polyparaxylylene layer via CVD (chemical vapor deposition) method or a method using a polymer binder. Among them, it is preferable to use a method using a polymer binder from the viewpoint of adhesion. The thickness of the sublayer is preferably 0.5 to 4 μm. By making the thickness to be 4 μm or less, it is possible to prevent deterioration of sharpness caused by light scattering within the sublayer. Hereafter, the composing element of the sublayer is described.

(Polymer Binder)

The sublayer of the present invention is formed preferably by coating a polymer binder material (hereinafter, also denoted simply as a binder) dissolved or dispersed in a solvent, followed by drying. Specific examples of such a polymer binder include: polyurethane, vinyl chloride copolymer, poly(vinyl chloride)-co-(vinyl acetate)), poly[(vinyl chloride)-co-(vinylidene chloride)], poly[(vinyl chloride)-co-acrylonitrile], poly(butadiene-co-acrylonitrile), polyamide, polyvinyl butyral, polyester, cellulose derivatives (e.g., nitrocellulose), polystyrene-co-butadiene), various synthetic rubber resins, phenol resin, epoxy resin, urea resin, melamine resin, phenoxy resin, silicone resin, acrylic resin and urea formamide resin. Of these, it is preferable to employ an acrylic resin, polyurethane, polyester, vinyl chloride copolymer, polyvinyl butyral or nitrocellulose.

The polymer hinder preferably used in the present invention is polyurethane, polyester, vinyl chloride copolymer, polyvinyl butyral or nitrocellulose, from the viewpoint of close adhesion. The glass transition temperature (Tg) of the polymer binder is preferably from 30 to 100° C. from the viewpoint of adhesion of the vapor deposited crystal with the support, From these aspects, an acrylic resin and a polyester resin are specifically preferred.

Examples of a solvent for use in preparation of a sublayer include a lower alcohol such as methanol, ethanol, n-propanol or n-butanol; a chlorine-containing hydrocarbon such as methylene chloride or ethylene chloride; a ketone such as acetone, methyl ethyl ketone or methyl isobutyl ketone; an aromatic compound such as toluene, benzene, or xylene; a cyclic hydrocarbon compound such as cyclohexane car cyclohexanone, an ester of a lower carboxylic acid and a lower alcohol, such as methyl acetate, ethyl acetate or butyl acetate; an ether such as dioxane, ethylene glycol monoethyl ester, or ethylene glycol monom ethyl ester; and an ether such as dioxane, ethylene glycol monoethyl ester, or ethylene glycol monornethyl ester; and a mixture of these compounds.

The sublayer of the present invention may contain a pigment or a dye to inhibit scattering of light emitted from a phosphor (scintillator) to achieve enhanced sharpness.

(Method of Dividing into a Plurality of Second Scintillator Panels)

In the dividing step, the above-described first scintillator panel is divided into a plurality of second scintillator panels.

As a method of dividing, there can be cited, for example, cutting with a laser or cutting with blade, and conventionally known laser cutting device or a blade dicing device can be sued. When the support is made of glass, a laser dicing can be applied. Laser dicing is a cutting method utilizing an optical damaging phenomenon generated when the strength of laser beam is made extremely large to induce multiple photon absorption by focusing the laser beam at the inner portion of an object to be processed. A reformed layer is formed in the inside of a glass, and dividing is started form the reformed layer. Laser dicing is beginning to be used for cutting of a silicon wafer in recent years.

As a way to produce a plurality of second scintillator panels by dividing the first scintillator panels using these methods, it may be cut from the support side, or it may be cut from the phosphor layer side. However, it is preferable to be cut from the support side from the viewpoint of damage resisting property of the phosphor layer.

In the present invention, it is especially suitable to cut from the support side to produce a plurality of second scintillator panels by using a laser.

In the following, the dividing step to divide the first scintillator panels into a plurality of second scintillator panels will be described by referring to a cutting method using a laser as an example.

Figure 2:
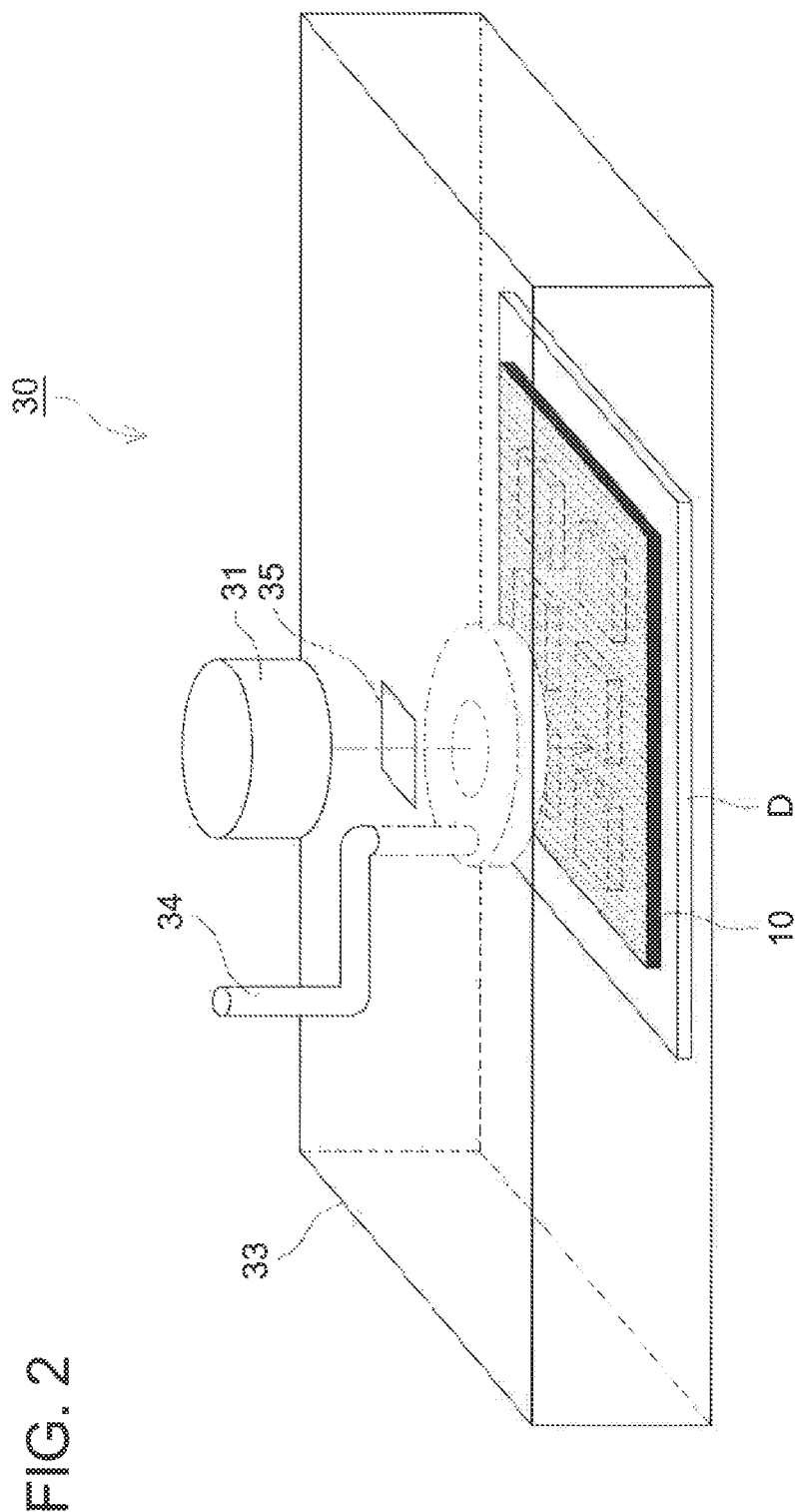
FIG. 2 shows a schematic Oblique perspective view of a laser cutting device used for dividing scintillator panel.

FIG. 2 shows a schematic oblique perspective view of a laser cutting device, and it shows an example of laser cutting for dividing a first scintillator panel 10.

A laser cutting device 30 is equipped with a purge chamber 33 formed in a box shape. The purge chamber 33 has an inner space almost completely sealed so that the floating dusts in the external space may not invade in the inner space. In addition, it is preferable that the inside of the purge chamber 33 is a damp low humidity ambient. Moreover, a light transmissive window 35 which makes a laser beam penetrate is formed on the top face of the purge chamber 33. Moreover, an exhaust pipe 34 which leads floating materials, such as dust, out of the purge chamber 33 is formed.

The first scintillator panel 10 is held on a base board D by laying the phosphor layer side of the first scintillator panel 10 with contacting on the base board D of the laser cutting device 30.

The first scintillator panel 10 laid on the base board is positioned directly under a laser irradiation portion via a laser generator 31 by a support transportation device (not shown). Laser is emitted from the laser generator 31 and a laser beam is irradiated to the first scintillator panel 10.

The first scintillator panel 10 is cut off with moving to X direction and Y direction by the support transportation device (not shown).

Examples of a laser which can be used for cutting include: an infra-red laser such as Nd:YAG, semiconductor, Nd:glass, Nd:YLF, Nd:BEL, Nd:YVO$_4$, LNP, Ti:sapphire, alexandrite, Co—MgF$_2$, Cr-GSGG, emerald, perovskite, Er-YLF and Er-glass; a visible light laser such as ruby, He—Ne, CO$_2$, Ar ions He—Cd, Cu, An, ST, Kr ion, Ne ion, Xe ion, CO, hydrogen halide, O$_2$—I, dye, and the second harmonic wave and third harmonic wave of Nd:YAG: and an ultraviolet laser such as Arf excimer, Krf excimer, XeF excimer, ArCl excimer; KrCl excimer, XeCl excimer, N$_2$, Au, and the fourth harmonic wave of Nd:YAG.

Among these, it is preferably used an ultraviolet laser having a wave length of about 266 nm. It is possible to carry out dissociation of the molecular bond, suds as a C—H bond and a C—C bond in an organic material at the same time of processing an object by a thermal action by a laser with a wave length of about 266 nm.

As an example of exposure conditions, it can be cited as a pulsed laser light with a beam diameter of 20 μm with a frequency of 5,000 Hz with an output of 300 mW using YAG-UV (yttrium-aluminum-garnet crystal: wave length of 266 nm).

(2) Adsorbing Step:

In the adsorbing step, an adsorbing member is provided between a side of the first support of each of the plurality of the second scintillator panels produced by dividing in the aforesaid dividing step and a side of a second support. Then, each of the plurality of the second scintillator panels and the second support are allowed to be adsorbed.

(Adsorbing Member)

An adsorbing member is supplied between the second support and the first support, and both supports are adsorbed with each other. In the adsorbing member, the portion of the adsorbing member whish is adsorbed to the second support side and the portion of the adsorbing member which is adsorbed to the first support side may be composed of the same material, or they may be composed of the different materials.

The adsorbing member may have a composition of being unified with the second support, and it may be composed of a material having a suctioning structure to adsorb with suctioning force by suctioning air.

The material in the portion of the adsorbing member adsorbing to the first support side and the material in the portion of the adsorbing member adsorbing to the second support side may be made of the same, or they may be different.

As a method of providing an adsorbing member between the second support and the first support, the following methods can be applicable. A plurality of adsorbing members are placed on the second support in advance in accordance with the size of the second scintillator panel, and then, each of the adsorbing members may be adsorbed to the first support of the second scintillator panel. Alternatively, an adsorbing member is adsorbed to the first support of the second scintillator panel in advance, and then, the adsorbing member may be adsorbed to the second support.

In the present invention, as is shown in (c) of FIG. 1, it is referable to used a method in which an adsorbing member 4 is placed on a second support 3 in advance, then the adsorbing member 4 is adsorbed to a first member 1 as is shown in (c) in FIG. 1.

A variety of adhesive agents can be used for a material employed for an adsorbing member. Examples of adhesive agents include known adhesives as: rubber adhesive, acrylic adhesive, vinyl alkyl ether adhesive, silicone adhesive, polyester adhesive, polyamide adhesive, urethane adhesive, fluorine containing adhesive, styrene-diene block copolymer adhesive, and adhesive incorporated with a thermo-melting resin having a melting point of 200° C. or less in these adhesives to improved creep property. These may be used singly, or they may be used in combination of tow or more kinds. Among them, a rubber adhesive and an acrylic adhesive are preferably used, and in particular, an acrylic adhesive is most preferably used.

These adsorbing members are adsorbed to the second scintillator panel with applying a pressure. Subsequently, it is preferable to peel off after subjecting to a protective layer step and a product examination step such as an optical examination and a visual examination. This peeling off is carried out by applying an appropriated force, heat, UV light irradiation, or cooling. Among them, in particular, it is preferable to use a material which can be peeled off by applying heat to the adsorbing member from the viewpoint of easiness of peeling off the adsorbing member from the second support.

As a material which can be peeled off by applying heat, it can be prepared with the following known method: mixing a foaming agent (such as thermo-swelling particles) and a solvent or other additive, if required, into an adhesive; then the prepared mixture is formed an a sheet type layer.

As an adsorbing member which can be peeled off by applying heat, it can be obtained as commercial products such as a thermal release sheet REVALPHA™ (made by Nitto Denko Corporation) and thermal foaming release sheet SOMATAC™ (made by SOMAR Corporation).

The temperature of applying heat to the adsorbing member at the time of peeling off the adsorbing member is preferable to be from 90° C. to 160° C.

It is suitably used a commercial product of a dicing tape used in the semiconductor filed as an adsorbing member which can be peeled off with force, cooling or UV light.

These adsorbing members may be used as a masking member when the first support is a detector base plate.

The size of the adsorbing member with respect to the size of the second scintillator panel is preferably 10% to 100% of the whole surface of the second scintillator panel when the surface of the adsorbing member contacting to the scintillator panel is one face. However, it is possible that the adsorbing members are adsorbed in two or more faces by considering the cost of the material. In this case, the contacting size may be 10% or less of the scintillator panel. As an example of contacting with two or more faces, (c) and (d) in FIG. 5 can be cited. As long as placing stably, the arrangement of the adsorbing members are not limited to them.

FIG. 5 shows a schematic plain figure which shows examples of an arrangement of an adsorbing member. For example, FIG. 5(a)-(d) show a schematic plain figure observed from a side of a base board D in (d) of FIG. 1.

The area contacting the adsorbing member with the second scintillator panel may be the whole surface of the adsorbing member having a flat shape. The area contacting the adsorbing member with the second scintillator panel may be small due to the concave or convex cross section shape of the surface of the adsorbing member. By using the adsorbing member having a convex cross section surface shape, it is possible that the protective layer may be formed in such a manner that the thickness of the protective layer will be gradually thinner toward the center of the adsorbing member. As a result, damage at the time of peeling off the adsorbing member will be decreased.

In the adsorbing step concerning to the present invention, the pressure applied to the adsorbing member to be adsorbed is preferably in the range of 0.01 to 1 MPa more preferably in the range of 0.01 to 0.1 MPa, still more preferably in the range of 0.01 to 0.05 MPa from the viewpoint of avoiding damage to the phosphor layer at the time of adsorbing when the phosphor layer is made of columnar crystals.

After adsorbing the first support with the second support. When the base board D is used, for example, as is shown in (d) of FIG. 1, the base board D or the second support is moved to result in the condition in which the second scintillator panel is installed on the second support through the intermediary of the adsorbing member 4. Then this is supplied to the next step of the protective layer teaming step.

(3) Protective Layer Forming Step:

In the protective layer forming step, the second support having the second scintillator panel thereon is used to form a protective layer on a whole surface of the plurality of the second scintillator panels except a portion of the second scintillator panels which is contacted with the adsorbing member.

The part (e) of FIG. 1 shows the state after forming a protective layer 5. In (e) of FIG. 1, the protective layer 5 is formed on the whole surface of the plurality of the second scintillator panels except a portion of the second scintillator panels which is contacted with the adsorbing member. Moreover, the part (e) of FIG. shows the state in which the whole surface including the second support is covered with the protective layer 5.

In the protective layer forming step, it is required to form a protective layer at least on the whole surface of the second scintillator panel except the portion of being adsorbed to the second support. It is not required to form a protective layer including on the second support. However, it may cover the whole surface including the second support with a protective layer by considering the easiness of timing a protective layer in the protective layer forming step.

(Formation of Protective Layer)

A protective layer is formed using a variety of known organic and inorganic materials with a vapor deposition method such as sputtering or CVD, a spin coating method or a dip coating method. Among them, the formation of a polyparaxylylene film with CVD method is especially suitably used.

Vapor deposition of polyparaxylylene using a CVD method is conformal coating. It is possible to form a film having a predetermined thickness by wrapping around the complex shape of the divided second scintillator panels of the present invention. The CVD vapor deposition method contains the steps of setting diparaxylylene as a raw material of polyparaxylylene and vaporizing; heat decomposing the vaporized diparaxylylene via heating to produce radicals; and vapor depositing the diparaxylylene in the state of radicals to deposit on the scintillator panel. The adsorbing member and the second scintillator panel are placed in the vapor deposition chamber with the phosphor layer being set in an upward direction.

Subsequently, the diparaxylylene which is vaporized at 175° C. in a vaporizing chamber and then radicalized at 690° C. in a heat decomposing chamber is introduced in a vapor deposition chamber through an inlet to deposit the protective layer (polyparaxylylene film) in a thickness of 10 μm. In this case, the vapor deposition chamber is kept at a vacuum degree of 13 Pa. And the turn table is rotated at a speed of 4 rmp. Further, an excessive amount of polyparaxylylene is evacuated thorough an exhaust pipe.

The thickness of the polyparaxylylene film is preferably from 2 μm to 20 μm. When it is adhered to the flat panel light receiving element, the thickness of the adhesive is preferably from 10 μm to 28 μm.

Moreover, abet melt resin can also be used on a phosphor layer as another embodiment for a protective layer. A hot melt resin can also be used to adhere a scintillator panel with a flat panel light receiving element. Although a polyolefin system resin, a polyester system resin, or a polyamide system resin is suitable used as a main component of the hot melt resin, the usable resins are not limited to them. The thickness of the hot melt resin is preferably 30 μm or less.

(Peeling off Step)

In the peeling off step, after forming the protective layer, the adsorbing member can be peeled off from the first support by relatively moving the second support with respect to the second scintillator panel provided with the protective layer.

In the peeling off step, although it depends of the material and the composition of the adsorbing member, a preferable embodiment is to use the aforesaid material which decreases the adsorbing property and to peel off this material by heating in the peeling off step.

(Phosphor Layer Forming Step)

Prior to carrying out the aforesaid dividing step, it is preferable to have a preparation step of a first scintillator panel by providing a phosphor layer on a first support.

The method of providing a phosphor layer on a support may be any known method. An example of a method of forming a phosphor layer is described below.

A phosphor layer is commonly composed of columnar crystals, and the columnar crystals can be formed with a gas phase accumulation method like a vapor deposition method. The following is a typical example of a vapor deposition method.

(Vapor Deposition Device)

Figure 3:
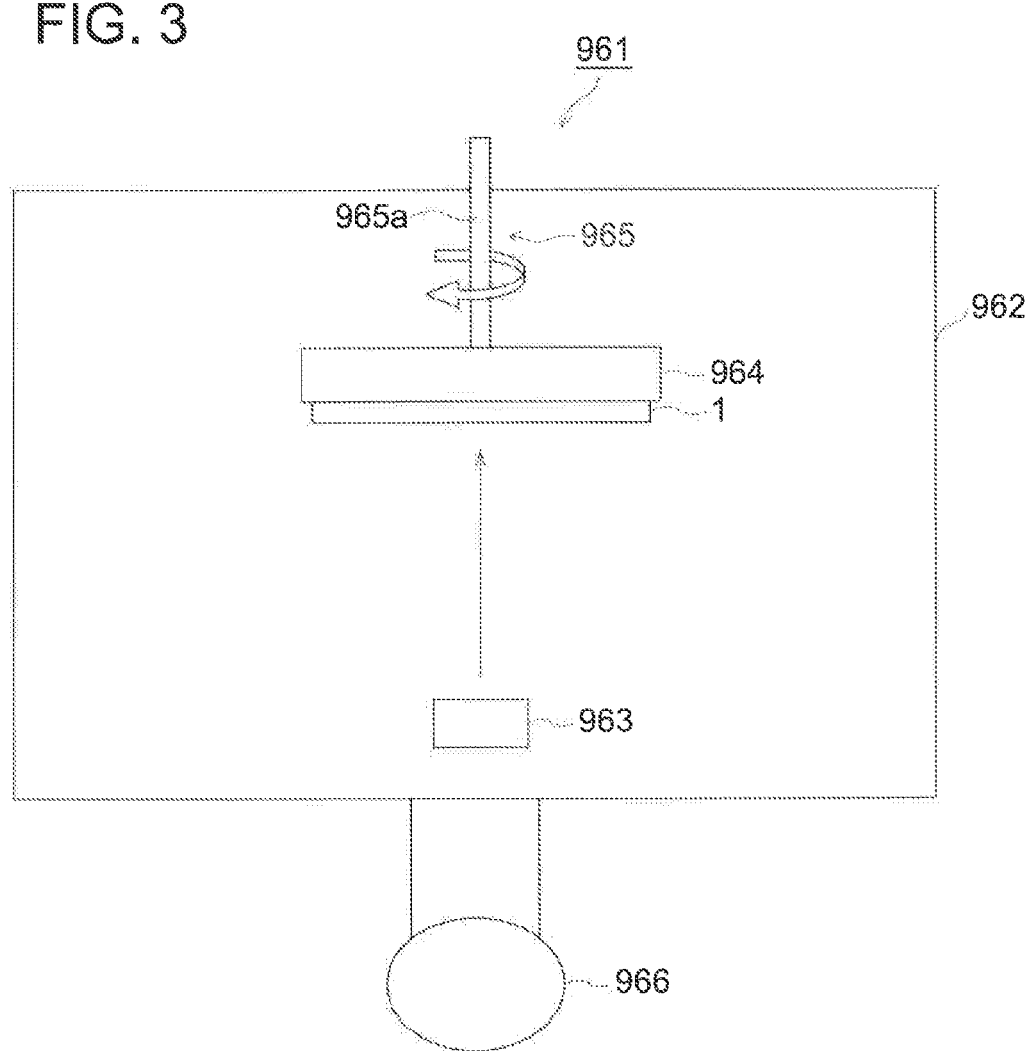
FIG. 3 shows a schematic sectional view of a vapor deposition device used for forming a phosphor layer.

FIG. 3 shows a schematic constitution of a vapor deposition device. In the drawing, a vapor deposition device 961 is provided with a box-shaped vacuum vessel 962 and a boat 963 used for vacuum deposition is disposed in the interior of the vacuum vessel 962. The boat 963 is a member which is filled with an evaporation source, and is connected to an electrode. The boat 963 is heated by Joule heat upon applying electrical current to the boat 963 through the electrode. In the preparation of the scintillator panel 10 used for radiation, the boat 963 is filled with a mixture containing cesium iodide and an activator compound; the mixture is heated and evaporated by applying an electrical current to the boat 963.

The member in which an evaporation source is placed may be an alumina crucible around which a heater is wound or a refractory metal heater.

A holder 964 to hold a first support 1 is disposed immediately above the boat 963 within the vacuum vessel 962. The holder 964 is provided with a heater (not shown in the drawing), whereby the first support 1 placed on the holder 964 is heated by operating the heater. Heating the first support 1 by the heater eliminates or removes adsorbed materials on the surface of the first support 1, inhibits generation of an impurity layer between the first support 1 and the phosphor layer 2 formed thereon, achieves enhanced contact of the first support 1 to the phosphor layer 2 formed thereon and controls the quality of the phosphor layer 2 formed on the first support 1.

The holder 964 is provided with a rotation mechanism 965 to rotate the holder 964. The rotation mechanism 965 is constituted of a rotation shall 965a connected to the holder 964 and a motor (not shown in the drawing), as a driving source. When driving the motor restates the rotation shaft 965a, the holder 964 rotates, while opposing the boat 963.

In the vapor deposition device 961, the vacuum vessel is provided with a vacuum pump 966 in addition to the foregoing constitution. The vacuum pump 966 performs evacuation of the inside of the vacuum vessel 962 and introduction of a gas into the inside of the vacuum vessel 962. Operating the vacuum pump 966 can maintains the inside of the vacuum vessel 962 under a gas atmosphere at a prescribed pressure.

A specific example using cesium iodide and thallium iodide will be described.

The first support 1 provided thereon with a reflective layer and a sublayer is placed onto the holder 964, and to plural boats (not shown in the drawing), a powdery mixture including cesium iodide and thallium iodide is charged (preliminary step). Herein, the distance between the boat 963 and the first support 1 is set to be within a range of 100 to 1,500 mm and the treatment of a vapor deposition step described below is performed, while maintaining the range of the set value. While maintaining the distance between the boat 963 and the first support 1, which is more preferably not less than 400 mm and not more than 1,500 mm, plural boats 963 are simultaneously heated to perform evaporation.

After completing the preliminary step, the vacuum pump 966 is operated to evacuate the inside of the vacuum vessel 962 so that the inside of the vacuum vessel 962 is under a vacuum atmosphere of not more than 0.1 Pa (vacuum atmosphere forming step). Herein, the vacuum atmosphere refers to an atmosphere with a pressure of not more than 100 Pa, and a pressure atmosphere of not more than 0.1 Pa is suitable.

Then, inert gas such as argon or the like is introduced into the vacuum vessel 962 and the interior portion of the vacuum vessel 962 is maintained under a vacuum atmosphere of 0.001 to 5 Pa and more preferably 0.01 to 2 Pa, Thereafter, a heater of the holder 964 and the rotation mechanism 965 are driven, and the first support 1 placed on the holder 964 and opposing the boat 963 is rotated, while being heated. The temperature of the first support 1 on which a phosphor layer is to be formed is preferably set to room temperature (25° C.) to 50° C. at the time of the start of deposition, and 100 to 300° C., more preferably 150 to 250° C. during deposition.

In this state, an electrical current is applied to the boat 963 from the electrode to heat a mixture containing cesium iodide and thallium iodide to approximately 700° C. for a predetermined time to evaporate the mixture, whereby numerous columnar crystals are successively grown on the surface of the first support 1 to obtain crystals with a desired thickness. Then, the support on which cesium iodide is deposited is taken out, and the surface of the phosphor is cleaned with an adhesive roller.

(Flat Panel Detector)

A flat panel detector is composed of a scintillator panel produced with the method for producing a scintillator panel of the present invention and a light receiving element, the phosphor layer facing the light receiving element, Integration by combining the phosphor layer side of the scintillator panel with the side of light receiving side of the light receiving element is called as coupling. As the method of coupling, there can be cited: a method of pressure bonding the two sides by using a cushioning member; a method of adhering with an adhesive; and a method of sticking with a matching oil.

When the scintillator panel and the light receiving element are adhered with an adhesive, both are pressed with a pressure of 10 to 500 g/cm$^2$ until the adhesive is solidified. Air bubbles are removed from the adhesive layer by applying a pressure.

Examples of a usable adhesive are a normal temperature solidifying adhesive such as an acrylic system adhesive, an epoxy system adhesive and a silicone system adhesive. In particular, a rubber system adhesive can be used as an adhesive having elasticity.

Examples of a rubber system adhesive which can be used are: a block copolymer system such styrene-isoprene-styrene a synthetic rubber adhesive such as polybutadiene or polybutylene and a natural rubber. An example of commercially available rubber system adhesive which is suitably used is a single liquid type RTV rubber KE420 (made by Shin-Etsu Chemical Co., Ltd.)

A silicone adhesive may be a peroxide cross-linking type or an addition-condensation type. It can be used singly or may be used in combination of two or more kinds. Further, it can be used by mixing with an acrylic system adhesive or a rubber system adhesive, and it can be used acrylic system adhesive having a pendant silicone component in a polymer main chain or a side chain.

When an acrylic system resin is used as an adhesive, it is preferable to use a resin prepared by reacting a radical polymerizable monomer, as a monomer component, containing an acrylic ester having an alkyl side chain of 1 to 14 carbon atoms.

An optical grease having stickiness can be applied to the scintillator panel and the light receiving element. Any known optical grease can be used if it has high transparency and high stickiness. An example of commercially available optical grease which is suitably used is silicone oil KF96H-1,000,000 CS (made by Shin-Etsu Chemical Co., Ltd.)

Figure 4:
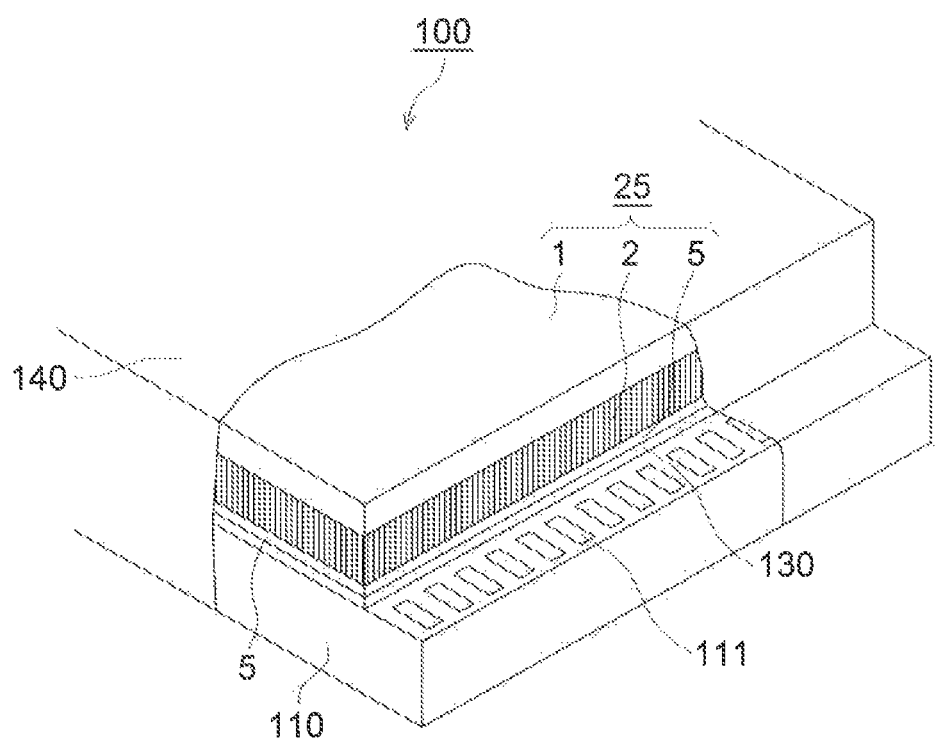
FIG. 4 shows a schematic oblique perspective view of a flat panel detector.

FIG. 4 shows a schematic oblique perspective view of a flat panel detector.

A scintillator panel 25 provided with a protective layer 5 is adhered to a CMOS type light receiving element 110 with an adhesive layer 130. In FIG. 4, a protective layer in a lateral side of a scintillator panel is omitted.

The first support 1 and the phosphor layer 2 each have the same size. The whole surface of the light receiving element 110 (except the signal take-out section 111) and the phosphor layer 2 are coupled together. The whole body of the flat panel detector 100 is sealed hermetically in a housing 140 made of a resin of low water permeability.

EXAMPLES

Hereinafter, the present invention will be further detailed with reference to examples but the present invention is by no means limited to these.

(Preparation of First Substrate Provided With Sublayer and Reflective Layer)

Silver was sputtered onto a 125 μm thick polyimide film of 1 m width and 100 m length (Upilex S, produced by Ube Kosan Co.) to form a reflective layer of 70 nm (700 angstrom). Subsequently, a solution of a polyester resin (Vylon 200 (made by TOYOBO Co., Ltd.) dissolved in methyl ethyl ketone was coated with a gravure coater followed by dried to form a sublayer of 3.0 μm (dried thickness). Then, by cutting this a substrate provided with a sublayer and a metal reflective layer was prepared.

(Formation of Phosphor Layer)

On the first substrate was deposited a phosphor (CSI 0.003Tl, containing 1 mole of CsI and 0.003 mole of Tl) using a vapor deposition device to form a phosphor layer. That is, in a resistance heating crucible (a boat) was loaded with phosphor raw materials (CsI and TlI) as vapor depositing materials, and the first substrate was installed in a metal frame of a rotating substrate holder with adjusting the distance between the support and the vapor source to be 400 mm.

Subsequently, the interior of the vapor deposition device was evacuated, and then, an Ar gas was introduced thereto to adjust the vacuum degree to 0.5 Pa.; thereafter, the substrate was maintained at 200° C., while rotating the substrate at a rate of 10 rpm. Then, the resistance heating crucible was heated to allow a phosphor to be deposited to form a 350 μm thick phosphor layer. The deposition was terminated and a first scintillator panel formed with a phosphor layer was obtained.

(Cutting and Adsorption)

The first scintillator panel was installed on a support holder of a laser cutting device (YAG-UV) as is shown in FIG. 2 with directing the first support upward. It was cut in a size of 24.7 mm×49.3 mm to form a second scintillator panel. Then, a pressure sensitive adhesive and thermal releasing material (a thermal release sheet REVALPHA™ (made by Nitto Denko Corporation) was laminated on a polycarbonate sheet as an adsorbing material to form an adsorbing material having a convex surface shape and a smaller size (15 mm×40 mm) than the second scintillator panel as arranged in (c) in FIG. 1 and (a) in FIG. 5. This polycarbonate sheet provided with an adsorbing material was pressure adhered onto the first support and the second scintillator panel was lifted up as shown by (d) in FIG. 1. The lifted scintillator panel was transferred to a protective film forming step in another chamber.

(Preparation of Protective Film)

The polycarbonate sheet arranged with the afore id second scintillator panel was introduced in a vapor deposition chamber of a CVD apparatus. By exposing to a vapor of a sublimated polyparaxylylene raw material, the surface of the scintillator panel (except the portion contacting the adsorbing member) and the second support were covered with a polyparaxylylene film having a thickness of 10 μm. The obtained product was directly subjected to an examination of shipping.

(Peeling Off)

The aforesaid second scintillator panel and the second support were left at an ambience of 100° C. for 10 minutes. Then, the second scintillator panel was peeled off by using a peeling off device.

(Evaluation)

Fifty pieces of thus prepared scintillator panels provided with the protective film were visually examined to cheek whether there was damage nine damage. After visual examination, it was confirmed that there was no damage on all of the prepared scintillator panels. The production yield was 100%.

On the other hand, as a comparative method for producing a scintillator panel, the scintillator panel was prepared in the same manner as the preparation method of the present invention to the completion of the aforesaid dividing step (1). Then 50 pieces of the divided second scintillator panels each were transferred manually, and each of them was provided with a protective layer, and then, the obtained product was subjected to an examination of shipping. The peeling of test and the evaluation were done in the same manner as described above. It was found that 40% of the tested samples exhibited peeling off and damage of the protective layer, and damage of the phosphor layer. The production yield was as low as 60%.

From the above-described evaluation results, it was found that the production method of the present invention enabled to produce a scintillator panel with high production yield and with low cost by using a simple way to provide with an adsorbing member in the production step, and also it was found that the production method of the present invention enabled to produce a scintillator panel having a variety of sizes.

What is claimed is:

1. A method for producing a scintillator panel comprising the steps of:
   (1) providing a first support having thereon a phosphor layer;
   (2) dividing the first support having thereon the phosphor layer into a plurality of scintillator panel sections, each of the scintillator panel sections having a first support section and a phosphor layer section thereon;
   (3) providing an adhesive member between a side of the first support section of each of the plurality of the scintillator panel sections and a side of a second support;
   (4) adhering the plurality of the scintillator panel sections to the second support; and
   (5) after step (4), forming a protective layer on a whole surface of the plurality of the scintillator panel sections except a portion of the scintillator panel sections which is contacted with the adhesive member.

2. The method for producing a scintillator panel of claim 1 further comprising the step of:
   peeling off the adhesive member from the first support section of each of the scintillator panel sections, after the protection layer forming step.

3. The method for producing a scintillator panel of claim 2, wherein the peeling off step is a heat-peeling off step which applies heat to the adhesive member.

4. The method for producing a scintillator panel of claim 1, wherein the protective layer contains at least polyparaxylylene.

5. A scintillator panel produced by the method of claim 1.

6. A flat panel detector provided with the scintillator panel of claim 5.

* * * * *